July 4, 1967  H. A. McMASTER  3,329,493
PRESS BENDING APPARATUS
Filed Sept. 30, 1963  7 Sheets-Sheet 7

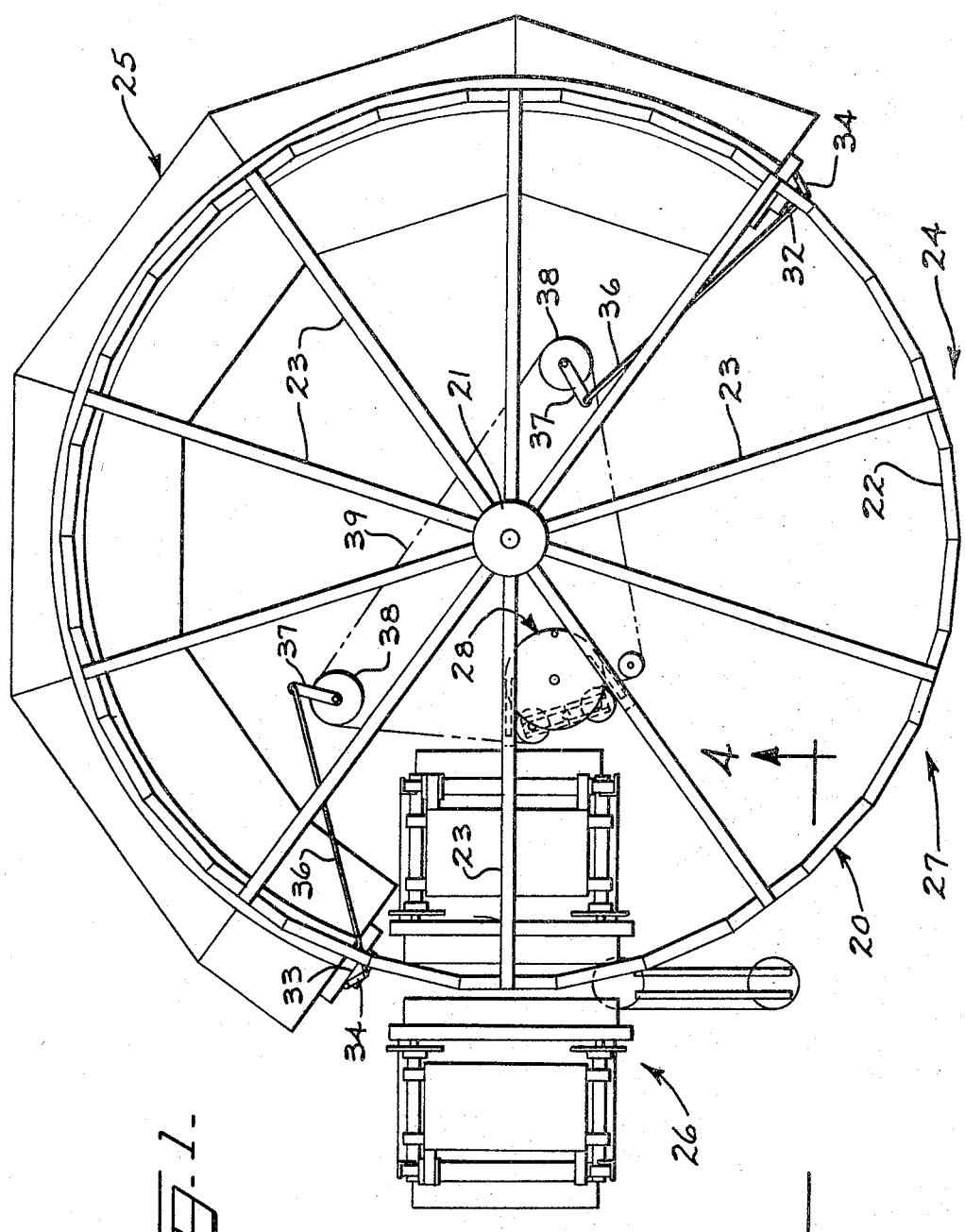

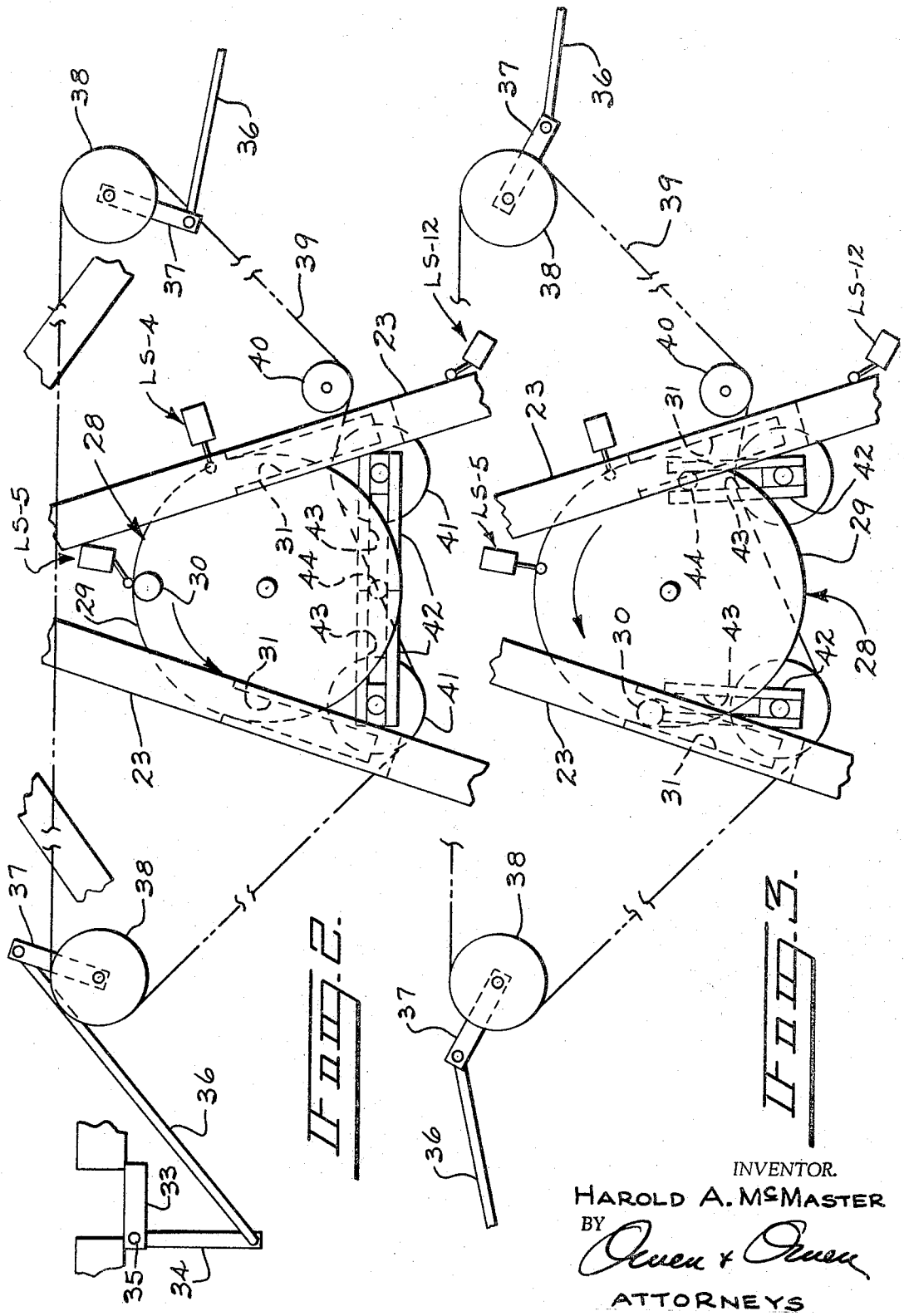

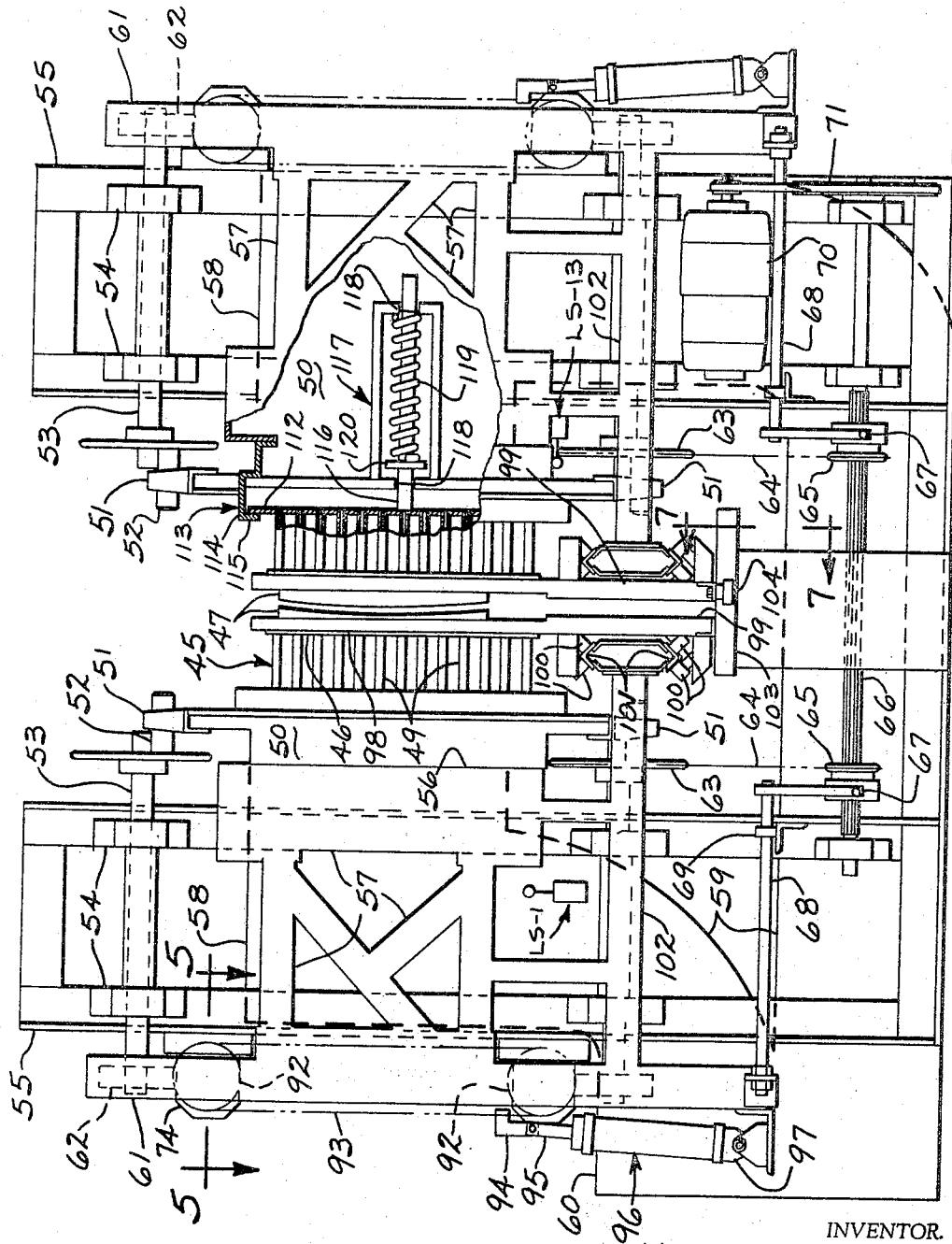

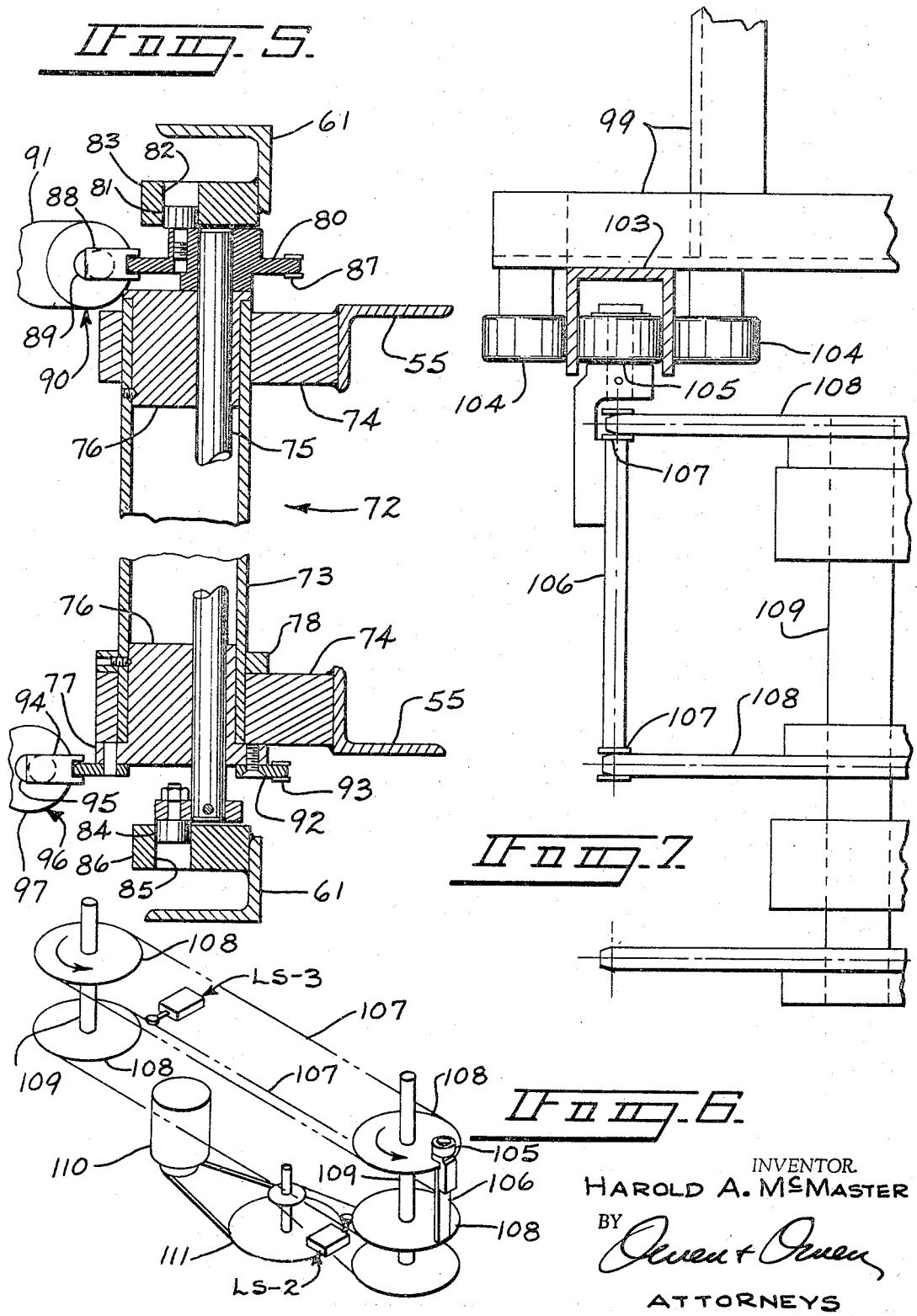

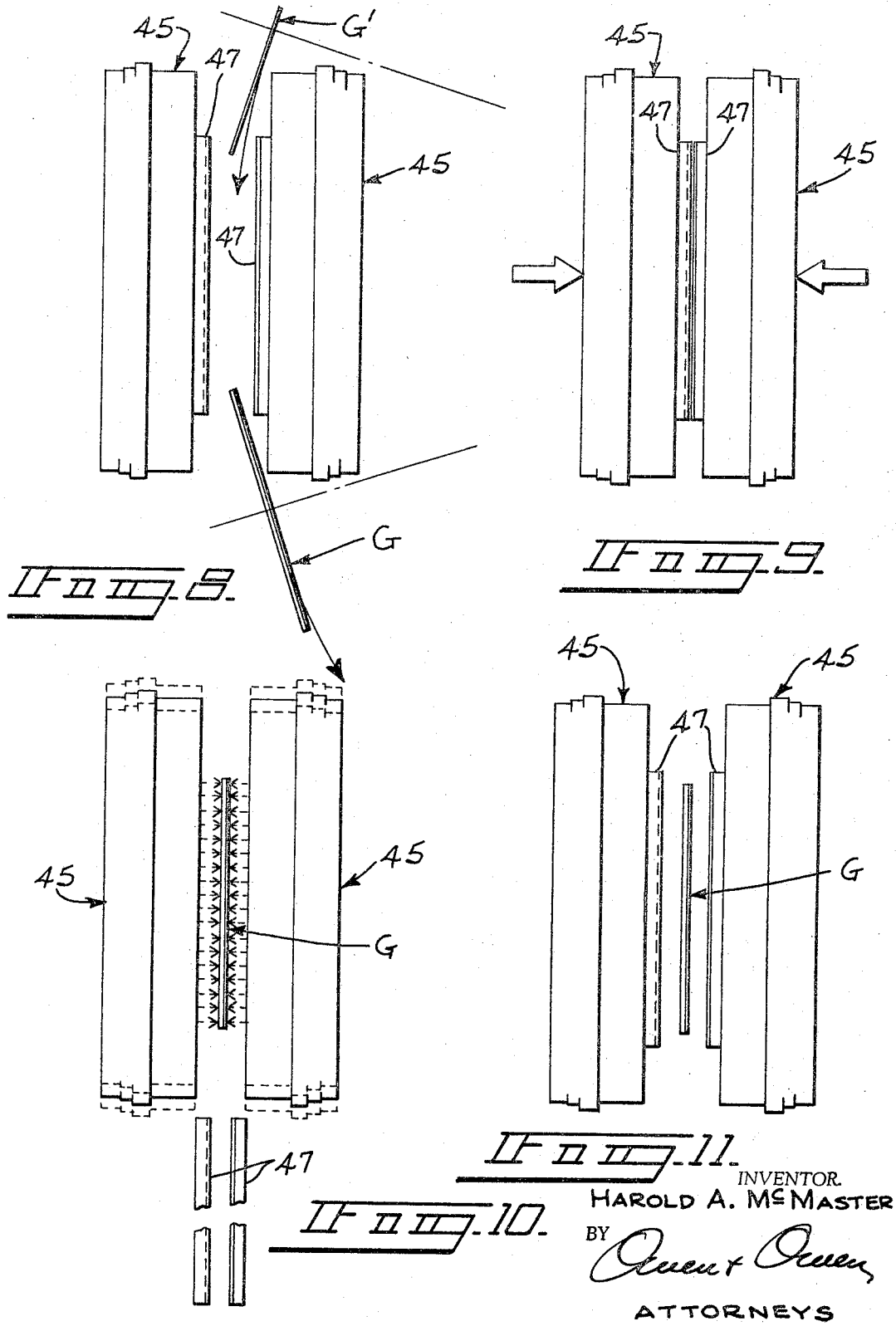

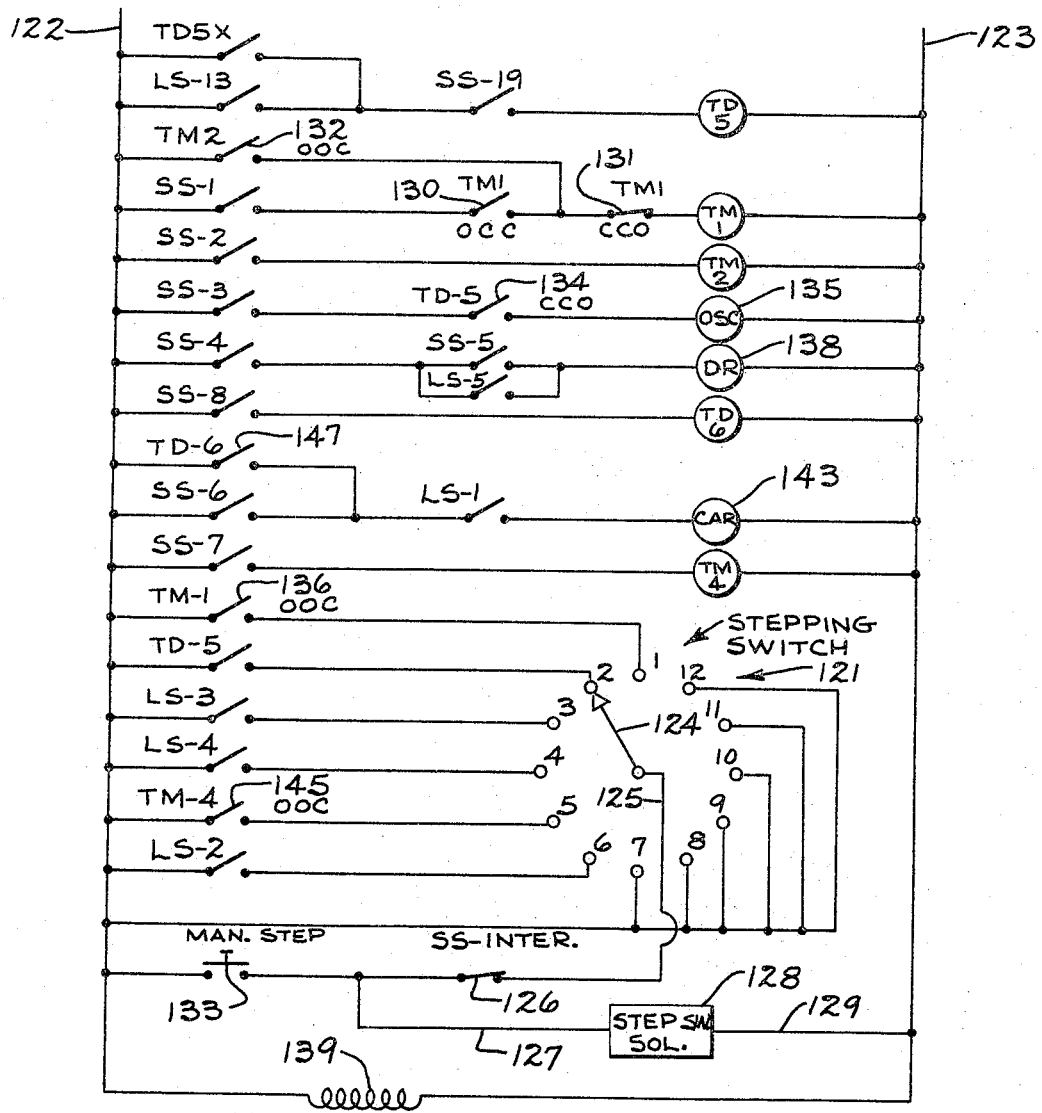
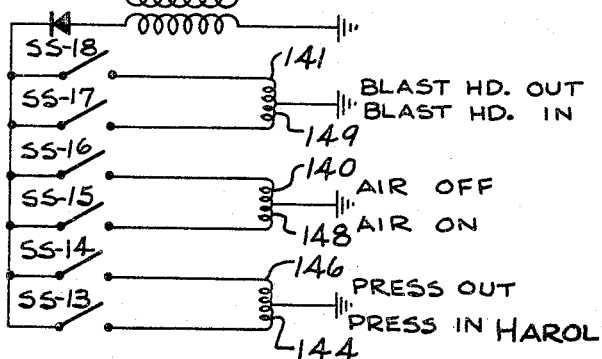

INVENTOR.
HAROLD A. McMASTER
BY Owen & Owen
ATTORNEYS

United States Patent Office 3,329,493
Patented July 4, 1967

1

3,329,493
PRESS BENDING APPARATUS
Harold A. McMaster, Woodville, Ohio, assignor to Permaglass, Inc., Woodville, Ohio, a corporation of Ohio
Filed Sept. 30, 1963, Ser. No. 312,420
4 Claims. (Cl. 65—287)

The present invention relates to apparatus for sequentially hot pressing and cooling glass.

An object of the present invention is the provision of a new and improved apparatus of the type having a conveyor which moves sheets of glass through stations where the glass is heated, bent and then cooled, and in which the bending and the cooling is done at the same station.

Another object of the invention is the provision of a new and improved apparatus of the above-mentioned type wherein the cooling is done by blastheads having rigid surfaces which face each other, and the bending is done by moving the blastheads toward each other to transfer force uniformly from the rigid surfaces of the blastheads onto a sheet of glass positioned between the blastheads.

The above-mentioned objects can be fulfilled by shaping the surfaces of the blastheads which face each other to the desired contour of the finished glass, and by moving the face of the blastheads directly against the piece of glass to compress the glass directly between the shaped faces of the blastheads. The blastheads must, of course, have openings in the faces which abut the glass in order that a cooling fluid can be expelled from the blastheads against the glass during the cooling operation which follows the pressing operation. It has been found that openings of approximately ½ inch in diameter leave imprints on the surface of the glass, and that these imprints can be avoided by reducing the size of these openings to approximately ¼ inch. However, with openings of approximately ½ inch in size, a conventional and low cost fan producing a discharge pressure of from 4 to 5 inches of water can be used to force air through the relatively large openings to adequately cool the glass. When openings of approximately ¼ inch in diameter are used, a blower producing a discharge pressure of several pounds per square inch is required. A blower capable of producing such an air pressure is more expensive than is one which produces only 4 to 5 inches of water pressure, and in addition requires a considerably greater amount of power to operate.

Another object of the invention is the provision of a new and improved apparatus of the above described type which can use low pressure air without deforming the surface of the glass.

A more particular object of the invention is the provision of a new and improved apparatus of the above described type, and in which dies are moved between the surfaces of the blastheads, a heated glass sheet is positioned between the dies, and compressive force is transmitted by the blastheads through the dies to bend the glass; thereafter, the blastheads are moved apart, the dies removed, and the glass is cooled by air issuing from the blastheads.

The invention resides in certain constructions and combinations, and arrangements of parts, and further objects and advantages will become apparent to those skilled in the art to which the invention relates from the following description of a preferred embodiment, described with reference to the accompanying drawings forming a part of this specification and in which:

FIGURE 1 is a diagrammatic plan view of an apparatus embodying the present invention and which comprises a circular conveyor which transfers sheets of glass through a furnace to a station where the sheets of glass are bent and cooled;

2

FIGURE 2 is a fragmentary, plan view of part of the mechanism shown in FIGURE 1 which moves the conveyor and opens the inlet and outlet doors on the furnace, showing the mechanism in the position occupied when the doors to the furnace are closed;

FIGURE 3 is a view similar to FIGURE 2 but showing the mechanism in the position occupied when the doors to the furnace are open and the glass sheet conveyor is ready to be moved;

FIGURE 4 is an elevational view taken approximately on the line 4—4 of FIGURE 1;

FIGURE 5 is a fragmentary sectional view taken on the line 5—5 of FIGURE 4;

FIGURE 6 is a diagrammatic perspective view of a drive mechanism that is used for moving dies between a first position between the blastheads for pressing a glass sheet to a position remote from the blastheads to permit air from the blastheads to cool the glass;

FIGURE 7 is a fragmentary elevational view taken on the line 7—7 of FIGURE 4 showing the means by which the mechanism of FIGURE 6 moves the dies into and out of pressing position;

FIGURE 8 is a fragmentary diagrammatic view showing the blastheads moved apart, the dies in position, and indicating operation of the conveyor to remove a cooled and bent piece of glass from between the dies and the introduction of a hot flat piece of glass into position between the dies;

FIGURE 9 is a fragmentary diagrammatic view showing the next sequence in the operation of the machine wherein the blastheads and dies are moved inwardly to compress a heated sheet of glass between the dies;

FIGURE 10 is a fragmentary diagrammatic view showing the dies moved out of position, and indicating the oscillation of the blastheads to distribute cooling air over the bent glass;

FIGURE 11 is a fragmentary diagrammatic view showing the blastheads separated, and indicating the introduction of the dies between the blastheads, such motion occurring just prior to the time that the bent sheet of glass is moved out of position between the blastheads;

Figure 13:
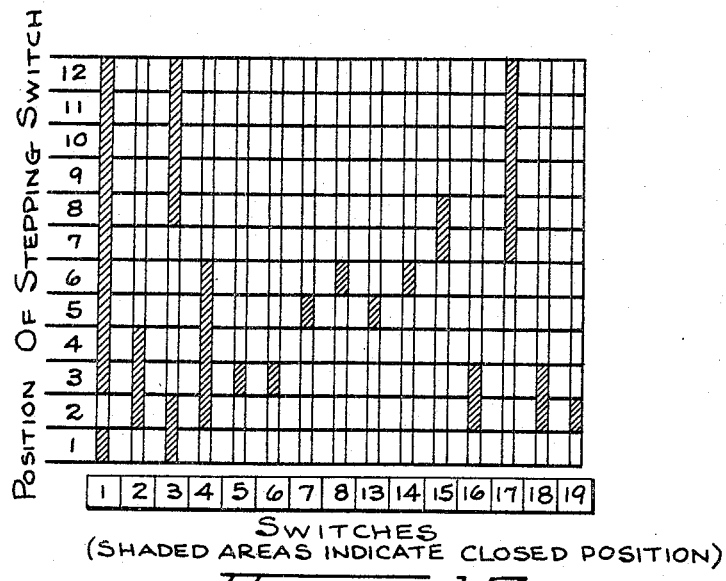

FIGURE 12 is a wiring diagram of the control mechanism for automatic operation of the glass heating, bending, cooling apparatus; and FIGURE 13 is a bar diagram showing the condition of the various cam operated switches of the stepping switch shown in FIGURE 12 in each of the 12 positions of the stepping switch—the shaded areas indicating the closed position of the several switches, and unshaded areas indicating the open position thereof.

While the invention may be otherwise embodied, it is shown herein in conjunction with apparatus comprising a circular conveyor which transmits sheets of glass hung from the conveyor through a heating zone to the apparatus of the present invention which bends and cools the glass. The apparatus shown comprises a circular conveyor 20 that is generally in the form of a wheel and which is commonly referred to as a "spider."

The spider 20 has a center plate 21 supported for rotation about a vertical axis, and an outer rim portion 22 that is supported from the center plate 21 by radial members 23. The rim portion 22 supports hangers, not shown, on which glas plates are inserted at a loading station 24, following which they are transmitted by an indexing movement through a circular furnace 25. The indexing operation and length of furnace is such that the plates of glass are at the proper temperature for bending at the time that the spider 20 moves the plates of glass out of the furnace and brings them into a station 26 at which the plates of glass are both bent and cooled. Thereafter the cool bent plates of glass are moved to an unloading station 27 where an operator removes the bent plates from the holders.

The indexing operation of the spider 20 is performed by means of a Geneva mechanism 28, best seen in FIGURES 2 and 3. The Geneva mechanism 28 comprises a drive disk 29 that is positioned beneath the radial members 23 and which carries on its topside vertical drive pin 30 which, during revolution of the drive disk 29, slides into grooves 31 in the bottom of the radial members 23 to rotate the spider 20.

Associated with the Geneva mechanism 28 is mechanism for simultaneously opening the inlet and outlet furnace doors 32 and 33 before the Geneva mechanism 28 starts to move the spider 20. The doors 32 and 33 have arms 34 fixed thereto for swinging the doors about vertical hinges 35, and the arms 34 are actuated by connecting rods 36 which in turn are actuated by arms 37 fixed to sprockets 38. The sprockets 38 are, in turn, simultaneously actuated by an endless chain 39 which passes around the sprockets 38, over an idler 40 and around a pair of drive sprockets 41. The drive sprockets 41 are positioned beneath the drive disk 29 and have a pair of arms 42 fixed thereto which are in aligned end-to-end relationship when the doors are closed. Each of the arms 42 has a longitudinally extending groove 43 in its top face which is adapted to receive a depending or lower drive pin 44 on the bottom of the drive disk 29.

When the Geneva mechanism 28 has performed its indexing operation of the conveyor and the furnace doors 32 and 33 are closed, the drive disk 29 is at rest in the position shown in FIG. 2 and the drive pin 44 is centered on the ends of the arms 42. Upon the next indexing operation, the drive disk 29 rotates counterclockwise as seen in FIGS. 2 and 3 so that the drive pin 44 moves into the groove 43 of the right hand arm 42 to rotate the arm clockwise and move the endless chain 39 in a generally counterclockwise direction. Movement of the chain rotates the left hand arm 42 counterclockwise while the right hand arm 42 is being moved clockwise, and the two arms continue to move for approximately 90 degrees of rotation, at which position (see FIG. 3) the lower drive pin 44 moves out of the groove 43 to become uncoupled with respect to the right hand drive arm 42. At this time the furnace doors 32 and 33 are fully open and the top pin 30 enters the groove 31 in a radial arm 23 of the circular conveyor to begin moving the conveyor 20. During the next approximately 180 degrees of rotation of the drive disk 29, the drive pin 44 is out of engagement with the arms 42 so that the furnace doors stay open, and the top pin 30 rotates the radial member 23 which it engages to the next indexed position, at which time the pin 30 leaves the groove 31 in the radial member 23 to complete the indexing of the conveyor 20. The drive disk 29 continues to rotate, however, for approximately 90 degrees more, during which time the lower drive pin 44 enters the groove 43 of the left hand arm 42 to swing the arms together again as seen in FIG. 2 and close the furnace doors 32 and 33. For a more complete discussion of the construction an operation of the mechanism for opening and closing the furnace doors, and for moving the conveyor, reference may be had to the Norman C. Nitschke and Harold A. McMaster application, Ser. No. 764,347, entitled "Apparatus for Heat Treating Glass."

A side elevational view of the pressing and cooling apparatus that is located at station 26, and which embodies the present invention, is shown in FIG. 4. The apparatus comprises a pair of opposing blastheads 45 having rigid flat face plates 46 which face each other and which are adapted to bear against the flat backs of a pair of dies 47 and force the dies 47 against the opposite faces of a sheet of glass positioned between them. The surfaces of the dies which face each other and which abut the sheet of glass are shaped to provide any desired contour to the sheet of glass.

Each of the rigid face plates 46 is provided with openings at predetermined spaced locations to which air is communicated at appropriate times through tubes 49. Inasmuch as the supporting and operating structures for the left and right blastheads 45 are identical (excepting that they are of opposite hand), only one of such supporting and actuating mechanisms will be described in detail.

The back ends of the tubes 49 are fixed to a movable air box structure 50 which is supported vertically at its four corners by pillow blocks 51, which receive crank arms 52 driven by horizontal shafts 53. The horizontal shafts 53 are in turn journaled in stationary bearings 54 in such manner that the shafts 53 can be moved horizontally through the bearings 54, and the bearings 54 are fixed to a support structure 55.

Rotation of the shafts 53 causes the air box structure 50 to oscillate vertically with a rotary motion and the back surface of the air box 50 is abutted by flat front surfaces 56 of a movable frame 57 which when given a horizontal closing or opening movement will impart a similar movement to shaft 53 and to the blasthead carried thereby. Stationary air ducting 58 is provided in the support structure 55, and an air seal arrangement, not shown, is provided between the air ducting 58 and the air box structure 50 to accommodate the oscillating movement of the air box structure 50. The air ducting 58 in each of the support structures 55 is brought together by means of branch headers 59 to a common duct 60 supplied with air pressure by a fan or blower (not shown).

The outer end of the movable frame 57 is provided with two uprights 61 which are supported from the backs of the shafts 53 by suitable bearings 62. A thrust connection is provided between the bearings 62 and the shafts 53 so that horizontal movement of the frame 57 is transmitted to the shafts 53. One bottom shaft 53 of each blasthead support is provided with a sprocket 63 by which it is rotated to move the air box structure 50 and in turn rotate the other three shafts 53 of the blasthead support structure. Sprocket 63 is driven by a chain 64, and a sprocket 65 that is mounted on a principal drive shaft 66 that is supported between the base of the two support structures 55. The sprockets 65 of each blasthead structure are splined to the center section of the drive shaft 66, and are slid along the drive shaft 66 in alignment with the driven sprocket 63 by yokes 67 that fit into grooves in the sprockets 65 and which are moved horizontally by rods 68 fixed to the support angles 61 and which are guided by the support structures 55 as at 69. The shaft 66 is driven by a motor 70 and a conventional V-belt drive 71.

The movable frames 57 are actuated by mechanism which brings the flat faces 46 of the blastheads from a first spaced-apart position to an inner position for the pressing operation and from the first spaced-apart position to an intermediate position in which are is blasted against the bent sheet of glass to cool the same. The structure for providing the movements to the three positions of the blastheads is shown in FIG. 5. The mechanism comprises a pair of identical actuating structures 72 that are located at the top and bottom of the uprights 61 of the movable frames 57. Each of the actuating structures 72 comprises a tube 73 the opposite ends of which are journaled in pillow blocks 74 fixed to the opposite sides of the support structure 55. A shaft 75 is journaled off center of the tube 73 by bearings 76 located at opposite ends of the tube 73 and fixed therein. One of the bearings 76 is provided with a flange 77 which bears against the outer face of the adjacent pillow block 74 to prevent axial movement of the assembly in one direction, and a collar 78 fixed to the tube 73 at the other side of the pillow block 74 prevent axial movement in the opposite direction. One end of each shaft 75 has a sprocket 80 fixed thereto which carries a roller 81 that is off center with respect to the shaft 75 by a distance equal to one-fourth of the distance between the outer and inner positions of the blasthead. Each roller 81 rides in a vertical slot 82 in a bar 83 fixed to the upright 61. The other end of each shaft 75 is also provided with a similar eccentrically located roller 84 which rides in a vertical slot 85 in a bar 86 fixed to the opposite upright 61.

The upper and lower sprockets 80 are connected together by an endless chain 87. The endless chain 87 is moved by a driving pin 88, received in one of its links and fixed to a piston rod 89 of a hydraulic cylinder 90 whose housing 91 is fixed to the lower end of the movable frame 57. Upon a retracting movement of the piston rod 89 into the cylinder 90, the shaft 75 is rotated 180° to move the movable frame 57 and blasthead structure from its outer position to its inner pressing position. Where, for example, the blastheads are spaced apart 11 inches in their outer position and the rollers 81 and 84 are positioned 1¾ inches off center with respect to the shaft 75, rotation of the sprockets 80 by 180 degrees moves the blastheads to an inner position wherein the blastheads are spaced 4 inches apart.

The opposite ends of the tubes 73 which journal the shafts 75 are each provided with a sprocket 92 and the sprockets 92 are connected by an endless chain 93 so that movement of one sprocket causes movement of the other. The endless chain 93 may be actuated by a structure identical with that which operates the chain 87 and which comprises a driving pin 94 received in one of the links of the chain 93, the driving pin 94 being connected to a piston rod 95 of a hydraulic cylinder 96 whose housing 97 is fixed to the lower end of the movable frame 57. Upon retraction of the piston rod 95, the tube 73 is rotated 180° to move the shaft 75 to the opposite side of the center line of tube 73 and is thus translated horizontally by a distance equal to twice the eccentricity of the shaft 75 in the tube 73. With the shaft 75 held against rotation in its bearings 76 the horizontal translatory movement of the shaft 75 is in turn transmitted through the rollers 81 and 84 to the bars 83 and 86 to thereby move the uprights 61 and blastheads 45 horizontally. In the position shown in FIG. 5, the hydraulic cylinder 90 is in its normal extended position, and the hydraulic cylinder 96 is in its contracted condition, so that the blastheads are in their intermediate position. When the hydraulic cylinders 96 of both blasthead structures are in their extended positions, the shafts 75 are moved to the opposite sides of the center line of their respective tubes 73 and the blastheads 45 stand in their first spaced-apart position. Where for example, the shaft 75 is positioned 1 inch off center with respect to the tube 73, rotation of the sprockets 92 by 180 degrees moves the blastheads to the intermediate position wherein the blastheads are spaced 7 inches apart. It will thus be seen that from the structures so far described, actuation of cylinder 90 moves the blastheads from their outer, spaced-apart position to the inner pressing position, while actuation of cylinder 96 moves the blastheads from the spaced-apart outer position to the intermediate position which will be hereinafter referred to as the blasting position.

The dies 47 are movable from a position between the blastheads 45 to a position spaced laterally of the blastheads 45 when the blastheads 45 are in their outer position. To this end, the dies 47 are supported at their opposite ends by uprights 98 which are connected by a frame 99 that carries four rollers 100 at each end (FIG. 4). The rollers 100 are arranged in top and bottom pairs, with the rolling contact surface of each pair of rollers positioned at 90° relative to each other. The top and bottom pairs of rollers 100 engage the outer surfaces of parallel horizontal angle members 101 whose surfaces are inclined at 45° to the horizontal. The corner of the top angle member faces upwardly, and the corner of the bottom angle member faces downwardly, and the angle members are supported from the respective movable frames 57 by arms 102. The bottom of the left hand die-supporting frame 99 (as seen in FIG. 4), has an inverted U-shaped yoke member 103 fixed to the bottom thereof which extends horizontally beneath the frame 99 of the right hand die supporting structure. The right hand die-supporting frame 99 has a pair of depending rollers 104 which abut the opposite outer faces of the downwardly extending legs of the yoke member 103, so that the right and left hand frames 99 are caused to move laterally together into and out of the space between the blastheads while at the same time permitting the frames to be moved toward and away from each other when in position between the blastheads.

The inverted U-shaped yoke member 103 is caused to move laterally parallel to the angle members 101 by a roller 105 that is positioned between the downwardly extending legs of the inverted U-shaped yoke member 103 (FIG. 7). The roller 105 is mounted on the upper end of a vertical driving bar 106 that is supported adjacent its upper and lower ends by connection to a pair of endless chains 107. These endless chains 107 pass around spaced apart pairs of sprockets 108 that in turn are supported by a pair of laterally spaced apart vertical shafts 109. One of the vertical shafts 109 is positioned adjacent the blasthead structures, while the other vertical shaft 109 is positioned laterally outwardly away from the blastheads generally in line with the angle members 101. The outer vertical shaft 109 is driven by a shuttle drive motor 110 and speed reducing mechanism 111. The shafts 109 are so spaced that when the vertical bar 106 is in the position shown in FIG. 6, the dies 47 are in a position free and clear of the blastheads 45, and when the vertical bar 106 is moved to the opposite end of the endless chains 107 the dies 47 are properly positioned between the blastheads 45.

In order that a smooth and uniformly distributed force will be applied to glass positioned between the dies 47 when the dies are forced against the glass by cylinder 90, at least one of the blastheads 45 of the preferred embodiment may be made movable relative to the air box structure 50 on which it is mounted. In the embodiment shown in the drawings, the right blasthead 45 (see FIG. 4), has a back end plate 112 which slides within a rectangular frame 113 that is fixed to, or is a part of, the front surface of the right hand air box structure 50. The rectangular frame 113 is, in the form shown, made from an L-shaped member having a forwardly extending leg portion 114 which projects forwardly of the air box structure 50, and a lateral leg portion 115 which is adapted to be abutted by the front of the end plate 112 to limit movement of the blasthead 45 away from the air box structure and to provide an air seal therewith. The end plate 112 is biased toward the lateral leg portion 115 by a spring-pressed horizontal bar 116 which bears against the center of the rear face of the end plate 112. The bar 116 is supported for horizontal sliding movement by a frame structure 117 positioned within the air box structure 50. The frame structure has spaced apart openings 118 through which the opposite ends of the bar 116 slide, and the bar is biased against the end plate 112 by a coil spring 119 positioned around the bar 116 between the end of the frame. A nut 120 which is adjustably threaded onto the bar 116 controls the force of the spring 119. The dies 47 are loosely carried by the frames 99 which support them, so that the dies are free to adjust to the glass under the action of the spring 119.

The general sequence of operation of the structure is depicted diagrammatically in FIGS. 8 through 11. In FIG. 8 the blastheads 45 are shown in the first, spaced-apart position, the dies 47 are positioned between the blastheads 45, and the conveyor 20 is indicated as moving a cool, bent sheet of glass G out from between the dies 47 and a new hot sheet of glass G' into position between the dies 47.

Thereafter, the blastheads 45 are moved towards each other to compress the dies 47 against the hot sheet of glass to bend the same, as indicated in FIG. 9.

Thereafter the blastheads are again moved out to the spaced-apart position, the dies 47 are withdrawn from between the blastheads, by a shuttle mechanism shown in FIG. 6, and the blastheads 45 are then brought into the intermediate blasting position. In this position the blastheads are oscillated and cool air is introduced through the tubes 49 to play over the bent sheet of glass as indicated in FIG. 10.

Finally, as indicated in FIG. 11, the blastheads 45 are again moved to the outer position and the dies 47 are moved into position between the blastheads in preparation for the next cycle.

The above sequence of operations is made automatic by an electrical control system whose wiring diagram is shown in FIG. 12. The control system utilizes a conventional, commercially available stepping switch 121 having 12 positions and 18 cam operated switches designated in the drawings by a symbol SS followed by a dash and a number. The condition of these switches in each of the positions of the stepping switch 121 is shown in bar diagram FIG. 13. Switches operated by timers are designated by TM followed by the number of the timer, and immediately adjacent the switches are three letters of various combinations of O and C. O stands for open, and C stands for closed. The first letter indicates the normal condition of the timer when de-energized; the middle letter indicates the condition of the timer while running, and the last letter indicates the condition at the end of the timing cycle. The timers are spring biased so that they return to their normal condition when they are de-energized. Limit switches are designated by the symbol LS followed by a dash and number, and the location of these switches on the mechanical structure above described will be pointed out as the operation is described in conjunction with the wiring diagram.

A suitable supply of alternating electricity is connected to the supply lines 122 and 123, and the operation of the device will usually be started with the stepping switch 121 in its Number 3 position with its contact arm 124 making connection with contact 3. Wire 125 connects to a normally closed switch 126 which in turn is connected by wire 127 to stepping solenoid 128 that in turn is connected to supply line 123 through wire 129. The stepping switch is such that the stepping switch interrupter switch 126 stays closed until the solenoid 128 completes its travel, whereupon the interrupter switch is opened and a spring, not shown, advances the contact arm 124 to the next contact.

In the Number 3 position of the stepping switch, switches SS-1, SS-2, SS-4, SS-5, SS-6, SS-16 and SS-18 are closed. Switch SS-1 is in series circuit with normally open timer switch 130, normally closed timer switch 131, and timer TM-1 between lines 122 and 123. Since switch 130 is normally open, closing of switch SS-1 does not start timer TM-1 running. The switch SS-2 is in series circuit with timer TM-2 between lines 122 and is in series circuit with timer TM-2 between lines 122 and 123 so that closing switch SS-2 starts timer TM-2 running. Timer TM-2 is allowed to time out to close its normally open switch 132 which is in series with timer switch 131 to energize timer TM-1. After timer TM-1 is started, it closes timer switch 130 and since switch SS-1 is closed, timer TM-1 is kept energized through switch SS-1, timer switch 130, timer switch 131 while timer TM-1 is running. A manual step switch 133 is provided in series between lines 122 and 127 to energize stepping switch solenoind 128 when the manual step switch 133 is closed. For the cycle to be automatic, timer TM-2 must be actuated to trip timer TM-1, so it is necessary to start in such a switch position that the proper sequence is obtained. Thus, as above noted, the cycle is started by the the operator with the stepping switch 121 in its Number 3 position and the step switch 133 is opened and closed repeatedly by the operator to advance the stepping switch arm 124 to its Number 1 position, and since switch SS-1 is closed in all positions of the stepping switch except position Number 2, the timer TM-1 is kept running while the stepping switch 121 is advanced manualy to position Number 1. During the manual stepping of the switch 121 from its Number 3 position, to its Number 1 position, the dies 47 are moved out of position from between the blastheads 45, the blastheads are caused to be moved to their intermediate blasting position, the air valving (not shown) is caused to move to its open position to supply air to the blastheads 45, and the blastheads are caused to oscillate. All of the foregoing takes place initially in rapid sequence and without a glass blank in place. The description is made for the sake of explaining the sequence of operations with relation to the circuit diagram.

In the Number 1 position of the stepping switch 121, switches SS-1 and SS-3 are closed. Switch SS-3 is in series with normally closed switch 134 and starter 135 for motor 70 which causes the blastheads to continue to oscillate. Timer TM-1 also operates switch 136 which is in series with contact 1 of the stepping switch 121. The switch 136 is open while the timer TM-1 is running and is closed at the moment that timer TM-1 times out to energize the stepping switch solenoid 128 and causes the stepping switch to advance to its Number 2 position. When timer TM-1 times out, switch 131 opens to de-energize the timer and allow the timer TM-1 to go back to its original position, again closing switch 131.

In the Number 2 position of the stepping switch 121, switch SS-1 is open to keep timer TM-1 from again being energized, and switches SS-2, SS-3, SS-4, SS-16, SS-18 and SS-19 are closed. Switch SS-2 is in series with timer TM-2 between lines 122 and 123 to start timer TM-2 running. Switch SS-4 is in series with normally open switch SS-5 and the starter on the drive motor 138 for the circular conveyor 20 which turns circular conveyor drive disk 29. A normally closed limit switch LS-5 is in parallel with switch SS-5 and is opened by pin 30 in the normal indexed and stopped position of the conveyor, so that the conveyor is not started when switch SS-4 is closed, but only upon closure of switch SS-5.

A transformer 139 is energized by lines 122 and 123 and contains a rectifier in its secondary winding to provide a reduced D.C. voltage to switches SS-13 through SS-18. Switch SS-16 is in series with a solenoid 140 which causes the air valve (not shown) to be closed in the air supply to duct 60 to shut off the air supply to the blastheads 45.

Switch SS-18 is in series with solenoid 141 which actuates a hydraulic valve (not shown) which causes the piston 95 of the hydraulic cylinder 96 to move out and the blastheads to move to their outer, spaced-apart positions. Switch SS-19 is in series with limit switch LS-13 and timer TD-5 between lines 122, 123. The limit switch LS-13 is carried by the support structure 55 and is closed by the blastheads 45 in their vertical oscillatory movement before they reach their lowermost position to start timer TD-5 running. A switch TD5X is in parallel with limit switch LS-13 and is closed immediately when timer TD-5 is started. When timer TD-5 times out it closes a switch 142 in series with contact 2 of the stepping switch 121 to energize the stepping switch solenoid 128 and move the stepping switch 121 to its Number 3 position. Timer TD-5 provides a time delay between the period that limit switch LS-13 is closed and the stepping switch 121 is moved to the Number 3 position to de-energize motor 70 and allow the blastheads to come to rest in their lowermost position.

In Number 3 position of the stepping switch 121, switches SS-2, SS-4, SS-18 are kept closed and switches SS–1, SS–5, and SS–6 are closed. The closing of switch SS–1 energizes switch 130 so that when timer TM–2 times out and closes switch 132 momentarily, timer TM–1 is kept running through switches SS–1 and 130. As previously indicated, switch SS–4 is closed, and upon closing of the switch SS–5, the drive motor for the conveyor is started. Immediately after the conveyor drive motor is started, pin 30 moves off limit switch LS–5 so that it closes and places the motor under control of switch SS–4. The switch SS–6 is in series with limit switch LS–1 and the starter 143 of the motor 110 which moves the dies toward the blastheads. The limit switch LS–1 is mounted on the support structure 55 and is only closed when the blastheads are in their position of greatest separation to receive the dies 47. The limit switch LS–1 is a safety switch, and since the switch SS–18 has previously been energized to move the blastheads 45 outwardly, limit switch LS–1 will normally be closed to allow the motor 110 to be energized. At a predetermined distance before the dies reach the proper position between the blastheads, bar 106 momentarily closes limit switch LS–3. The limit switch LS–3 is in series with contact 3 of the stepping switch, so that stepping switch solenoid 128 is energized to advance the stepping switch to position Number 4. In position Number 4, switch SS–6 is opened to deenergize the die shuttle motor 110 and allow the dies to come to rest in the proper position between the blastheads.

The conveyor motor 138 was started while stepping switch 121 was in position Number 3, and immediately thereafter pin 44 on drive disk 29 moved arms 42 to open the furnace doors 32 and 33. Thereafter pin 30 engaged a groove 31 in a radial member 23 to start the conveyor 20 moving. In position Number 4 switches SS–1, SS–2 and SS–4 remain closed. The timer TM–2 times out and the conveyor continues to run until pin 30 rides out of groove 31 to complete the indexing movement of the conveyor, and thereafter closes limit switch LS–4. Limit switch LS–4 is in series circuit with contct 4 of stepping switch 121 so that the closing of limit switch LS–4 energizes step switch solenoid 128 and advances the limit switch to position Number 5.

In position Number 5, switches SS–1 and SS–4 remain closed so that timer TM–1 and the conveyor motor 138 remains energized to cause pin 44 to engage left hand arm 42 as seen in FIG. 3 and close the furnace doors 32 and 33. The conveyor motor 138 runs until pin 30 contacts limit switch LS–5. Also in position Number 5, switches SS–7 and SS–13 are closed. The switch SS–7 is in series with timer TM–4 to start timer TM–4 running. The switch SS–13 is in series with solenoid 144 which operates valving which causes hydraulic fluid to flow to hydraulic cylinder 90 to retract the piston rod 89 into the cylinder and move the dies 47 together. The timer TM–4 allows a dwell time for the dies to remain against the glass and when it times out, it closes switch 145 which is in series with contact 5 of the stepping switch 121 to energize stepping switch solenoid 128 and advance the stepping switch 121 to position Number 6.

In position Number 6, switches SS–1 and SS–4 remain closed, and switches SS–8 and SS–14 are closed. The switch SS–8 is in series with timer TD–6 to start the timer, and switch SS–14 is in series with solenoid 146 which causes hydraulic fluid to retract the piston rod 89 of the cylinder 90 and move the blastheads 45 apart. After timer TD–6 times out, it closes switch 147 in series with limit switch LS–1 which, if the blastheads 45 are in their proper outermost positions, is closed to energize starter 143 for the shuttle drive motor 110 which moves the dies 47. As the dies 47 are moved outwardly, bar 106 momentarily closes limit switch LS–2 which is in series with contact 6 of the stepping switch 121 to cause the stepping switch to advance to position Number 7.

In position Number 7, switch SS–1 stays closed, switches SS–15 and SS–17 become closed and switch SS–8 is opened. The opening of switch SS–8 allows timer TD–6 to reset, opening switch 147 which deenergizes motor 110 and allows the dies 47 to come to rest in the "out" position. Switch SS–15 is in series with solenoid 148 which opens the valve (not shown) which supplies air to duct 60 and thus to the blastheads 45. The switch SS–17 is in series with solenoid 149 which operates valving to supply hydraulic fluid under pressure to retract the piston 95 into cylinder 96 and move the blastheads 45 to their intermediate spacing. Contacts 7 through 12 of the stepping switch 121 are always energized by line 122 so that immediately after the contact arm moves into position Number 7, the stepping switch solenoid 128 is actuated to advance the stepping switch 121 to Number 8 position.

In Number 8 position, switches SS–1, SS–15 and SS–17 remain closed so that the timer TM–1 continues to run, the blastheads stay in their blasting positions, and air is blown through the blastheads 45. In position Number 8, switch SS–3 is closed. The switch SS–3 is in series with normally closed switch 134, so that the starter 135 of the motor 70 is energized to start the blastheads 45 oscillating. The blastheads 45 remain in blasting position, with the air turned on and the blastheads 45 oscillating while the stepping switch 121 is sequentially stepped back to its Number 1 position and until timer TM–1 times out to close switch 136 and repeat the cycle of operation.

The glass pressing and cooling apparatus above described is designed so that force is transferred through the blasthead structures to bend the glass, and thereafter cooling air is admitted to cool the glass at the same conveyor station. As previously indicated, the blastheads are provided with large air openings so that low pressure air can be used to cool the glass; and in order that the large air openings in the blastheads will not leave marks on or deform the pressed glass, dies 47 are moved into position between the blastheads to perform the actual shaping of the glass. In another embodiment which can be made, the surfaces 46 of the blastheads can be contoured to do the pressing of the glass, and the cooling air openings in the curved surfaces 46 can be made small enough so that they do not leave imprints in the bent glass. With such an arrangement, the dies 47 and their actuating mechanism can be omitted, but air at a considerably higher pressure will have to be supplied to the duct 60.

While the invention has been described in considerable detail, I do not wish to be limited to the particular embodiment shown and described, and it is my intention to cover hereby all novel adaptations, modifications, and arrangements thereof which come within the practice of those skilled in the art to which the invention relates.

What I claim is:

1. Apparatus for hot pressing glass and the like comprising: a pair of blastheads each of which has a surface which faces an opposing surface of the other of said blastheads, said opposing surfaces having openings therein for expelling a cooling fluid, means for moving said blastheads toward and away from each other, a pair of contoured bending dies movable toward and away from each other, means for moving said pair of dies from a position spaced laterally from said blastheads to a position between said opposing surfaces of said blastheads, means for moving said blastheads toward each other and against said pair of dies to press said dies against a sheet of glass positioned between said dies, means for causing said blastheads to be moved apart and said dies moved laterally from between said blastheads, and means for causing cooling fluid to be blown through said openings of said blastheads to cool the bent sheet of glass.

2. Apparatus for hot pressing glass and the like comprising: a pair of blastheads each of which has a rigid flat surface which faces an opposing rigid flat surface of the other of said blastheads, said opposing surfaces having openings therein for expelling a cooling fluid, said blastheads being movable toward and away from each other, a pair of contoured bending dies movable toward and away from each other, said dies having facing contoured surfaces and having flat oppositely facing surfaces for substantially uniform engagement by said rigid flat surfaces of said blastheads, means for moving said pair of dies from a position spaced laterally from said blastheads to a position between said opposing surfaces of said blastheads, means for moving said blastheads toward each other and against said oppositely facing surfaces of said dies to press said dies against a sheet of glass positioned between said dies, means for causing said blastheads to be moved apart and said dies moved laterally from between said blastheads, and means for causing cooling fluid to be blown through said openings of said blastheads to cool the bent sheet of glass.

3. Apparatus for hot pressing glass and the like comprising: a conveyor for moving glass supports in a predetermined path through various stations including a high temperature station spaced in one direction from a glass bending station, a pair of blastheads respective ones of which are positioned on opposite sides of said conveyor at said glass bending station, said blastheads being movable toward and away from each other and having opposing surfaces which face each other and which have openings therein for expelling a cooling fluid, a pair of contoured binding dies movable from a position between said blastheads to a position spaced clear of said blastheads, said dies being normally spaced apart and being movable toward each other to press glass therebetween, means for causing said conveyor to index to move a glass support out of said pressing station and move another glass support from said high temperature station to said bending station when said blastheads are spaced apart and said dies are positioned between said blastheads, means for causing said blastheads to move toward each other against said dies to press glass held in the support at said bending station, means for causing said blastheads to move apart and causing said dies to move to said position clear of said blastheads, means causing a cooling fluid to be expelled from the openings in said blastheads to cool glass in the support at said loading station, and means causing said dies to move to said position between said blastheads and said conveyor to index to repeat the cycle.

4. Apparatus for hot pressing glass and the like comprising: a conveyor for moving glass supports in a circular path through various stations including a high temperature station spaced in one direction from a glass bending station, a pair of blastheads respective ones of which are positioned radially inwardly and outwardly of said glass bending station, said blastheads being movable toward and away from each other and having opposing surfaces which face each other and which have openings therein for expelling a cooling fluid, a pair of contoured bending dies movable laterally from a position between said blastheads to a position spaced clear of said blastheads in the opposite direction of said glass bending station from said high temperature station, said dies being normally spaced apart and being movable toward each other to press glass therebetween, means for causing said conveyor to index to move a glass support out of said pressing station and move another glass support from said high temperature station to said bending station when said blastheads are spaced apart and said dies are positioned between said blastheads, means for causing said blastheads to move toward each other against said dies to press glass held in the support at said bending station, means for causing said blastheads to move apart and causing said dies to move to said position spaced laterally from said blastheads, means causing a cooling fluid to be expelled from the openings in said blastheads to cool glass in the support at said loading station, and means causing said dies to move to said position between said blastheads and said conveyor to index to repeat the cycle.

References Cited
UNITED STATES PATENTS 2,251,159    7/1941    Owen _____ 65—273 X
3,256,080    6/1966    Vranken _____ 65—275 X DONALL H. SYLVESTER, *Primary Examiner.*

S. LEON BASHORE, *Examiner.*

A. D. KELLOGG, *Assistant Examiner.*